Figure 1:
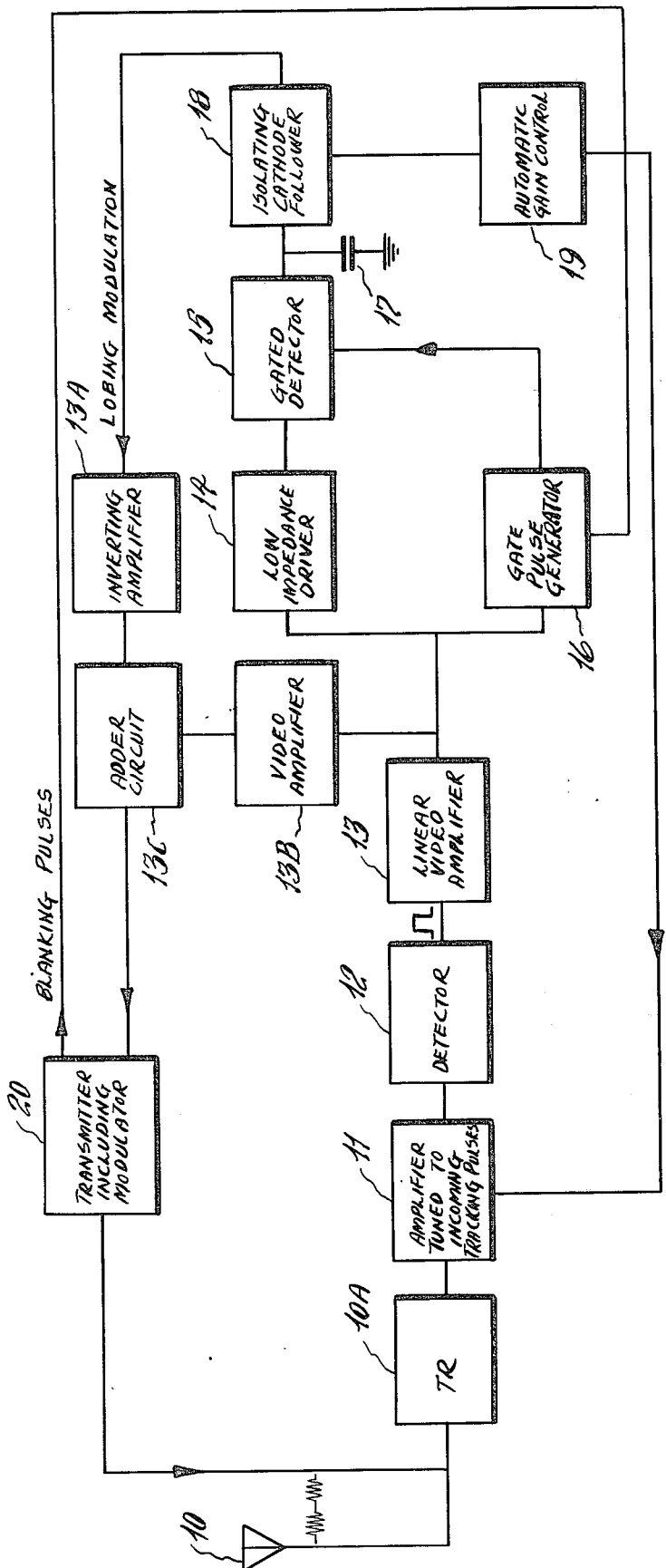

United States Patent [19]

Schrader, Jr.

[11] 3,896,438
[45] July 22, 1975

[54] TRACKING RADAR COUNTERMEASURE
[75] Inventor: Leo W. Schrader, Jr., East Williston, N.Y.
[73] Assignee: The United States of America as represented by the Secretary of the Navy, Washington, D.C.
[22] Filed: June 2, 1959
[21] Appl. No.: 817,680

[52] U.S. Cl. .............................. 343/18 E; 343/17.7
[51] Int. Cl.[2] ......................... G01S 7/38; G01S 7/40
[58] Field of Search ............... 343/17.7, 18, 16, 7.4, 343/18 E; 250/15 T Primary Examiner—Malcolm F. Hubler
Attorney, Agent, or Firm—Richard S. Sciascia; Arthur A. McGill; Prithvi C. Lall

EXEMPLARY CLAIM

5. A device for detecting, at a target, the lobing modulation of tracking pulses arriving at said target from a conical scan radar with time lag on the order of a fraction of the width of the tracking pulses which comprises, at said target, receiving means for intercepting, amplifying and detecting said tracking pulses, a condenser, low-impedance gate means connecting said receiving means and said condenser, normally operable for blocking any transfer of energy in both directions between said receiving means and said condenser but operable when opened to connect said condenser and receiving means and thereby adjust the voltage on said condenser according to the amplitude of the detected pulse arriving while the gate is opened, gate-pulse generating means connected between said receiving means and said gate means, responsive to said detected pulse and causing opening of said gate means solely during a selected portion of the peak of said pulse, bias creating means having a high input impedance and low output impedance connected to said condenser for providing a bias voltage varying according to the voltage variations on said condenser and means connecting said bias creating means and said receiving means for providing automatic gain control bias to said receiving means and cause the latter to operate continuously linearly independently of incoming pulse amplitude and preserve lobing modulation of the incoming pulses.

7 Claims, 5 Drawing Figures

PATENTED JUL 22 1975

3,896,438

SHEET 1

INVENTOR.
LEO W. SCHRADER, JR.
BY
Max H. Farmer
ATTORNEYS

TRACKING RADAR COUNTERMEASURE

This invention relates to countermeasures against tracking radar and more particularly to a device for detecting at a target the lobing modulation of tracking pulses arriving at the target from a conical scan tracking radar for providing the lobing modulation to a transmitter located at the target to enable the transmitter to generate deception pulses having amplitude modulation out of phase with the lobing modulation.

Conical scan radar equipment is well known and is described in the literature and its function in tracking moving targets is equally well known. Information on this subject is published in volumes 1, 20, 23, and 26 of the "Radiation Laboratory Series" published by McGraw-Hill, 1947. This class of equipment generates a pencil-like beam of pulsed radiant energy and continuously varies the direction of the beam so that it describes a cone cyclically, with the apex of the cone at the scanning equipment. The cyclic frequency of conical scanning varies considerably among tracking equipments that are used but to provide some reference as to order of magnitude, conical scan frequencies of about 30 cycles per second are common. One method of obtaining this cyclic scan is to support a dished reflector for rotation about an axis through its center but with the axis of rotation and the axis of the dished reflector at an angle of several degrees; the size of the included angle depends in part upon the beam width. If constant amplitude pulses are transmitted by the scanner at a constant repetition rate, and the axis of rotation of the scanner and the target are in line, the echoes returned by the target and sensed by the scanner do not have cyclic amplitude modulation; however, if the range is changing, the amplitude of successive echoes sensed by the scanner varies inversely with the change in the range. However, if the target is transversely spaced from the axis, the amplitude of the echoes returned from the target and sensed by the scanner varies cyclically at the scanner rotation rate. The envelope of the pulse echoes returned from the target and sensed by the scanner is called the lobing modulation. The amplitude of the lobing modulation is an indication of how much angular correction the scanner needs to direct it toward the target, and the phase between the lobing modulation and the circular motion of the scanner indicates the direction of the adjustment necessary to direct the scanner axis toward the target.

In many equipments, the scanner adjustment is divided into two parts, elevation and azimuth adjustment. The pulse echoes obtained during the highest position of the rotating antenna and the lowest position of the rotating antenna in the scan cycle are continually compared and their difference used for elevation adjustment; likewise, the pulse echoes during the left-most position of the rotating antenna and the right-most position of the rotating antenna are continually compared and their differences used for azimuth adjustment. Automatic tracking equipment includes servomechanisms for adjusting the position of the antenna relative to the target being tracked to keep the scanner on target even during evasive action by the target.

The useful information obtained from a conical scanner includes the elapsed time between each emitted pulse and its echo returned from a target for adjusting the range gate to lock the tracking equipment on target rangewise, and the amplitude of the lobing modulation of the echo pulses and the phase between the lobing modulation and the rotary position of the scanning antenna for adjusting the axis of the scanning antenna to reduce the lobing modulation to zero. The conical scan equipment will lose the echoes from the target if the range gate at the tracker is shifted enough to block echoes from the target and will be deflected off the target if the phase and amplitude of the lobing modulation of a train of pulses received by the scanner is substantially different from the actual lobing modulation of echoes returned from the target.

An object of this invention is to ascertain at a moving target tracked by a conical scan radar the lobing modulation of the tracking radar pulses, with negligible phase delay relative to the modulation of tracking pulses arriving at the target for use in the generation and transmission of angle deception pulses for causing the tracking radar to lose the target.

A further object is to accomplish the preceding object without permitting any locally generated deception pulse from feeding back into the deception pulse generating equipment and influencing the generation of the succeeding deception pulse.

A further object is to generate angle deception pulses at a target wherein the time spread between the leading edge of a tracking pulse arriving at the target and the leading edge of the respective angle deception pulse is on the order of 0.25 microseconds.

Figure 2:
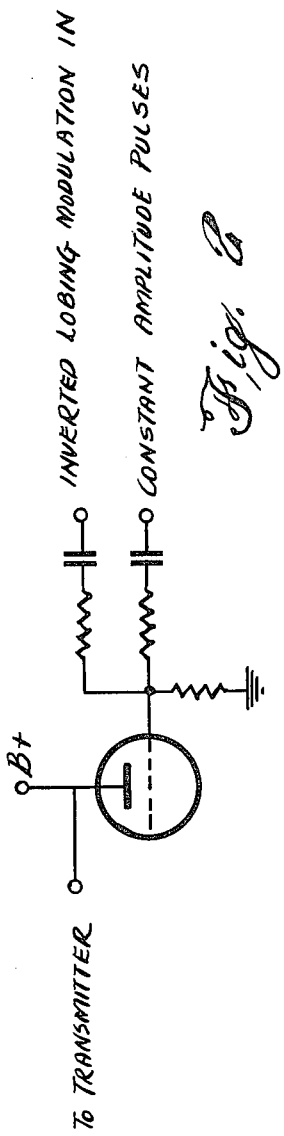
Figure 3:
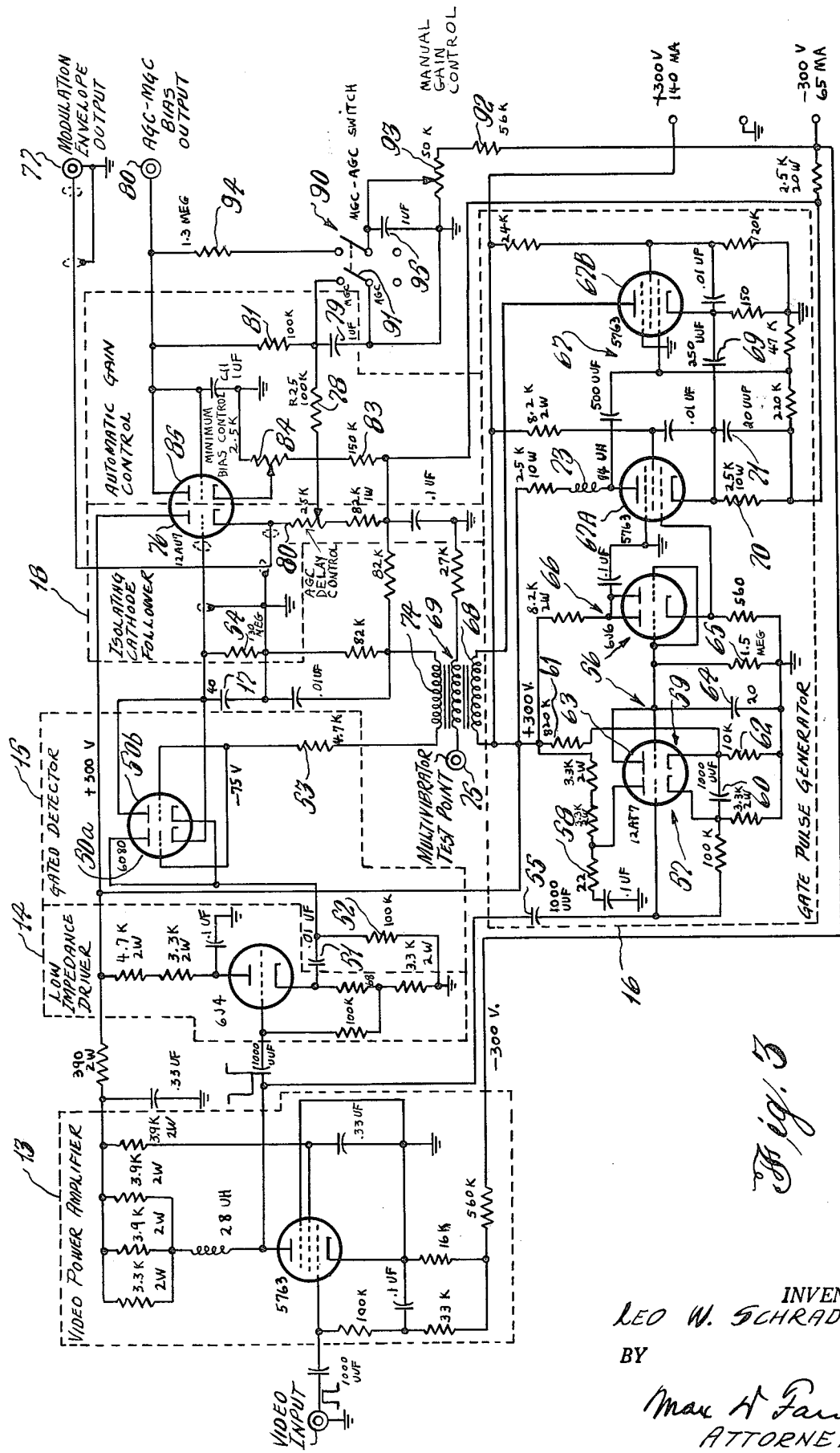
Figure 4:
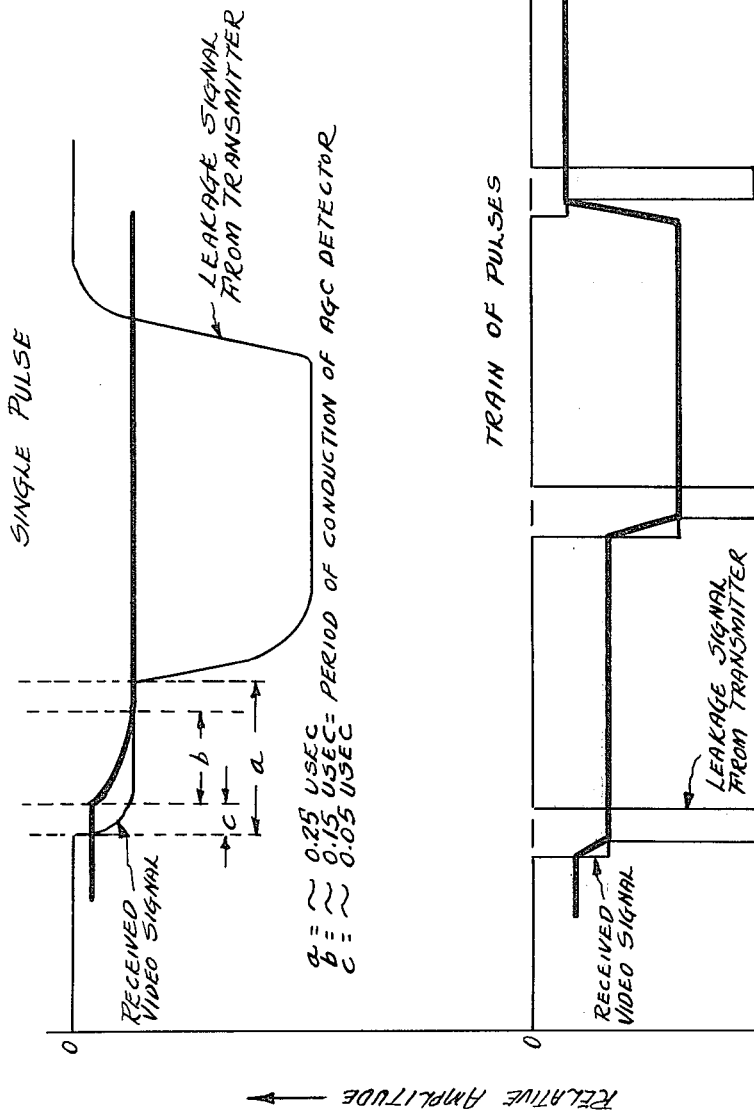
Figure 5:
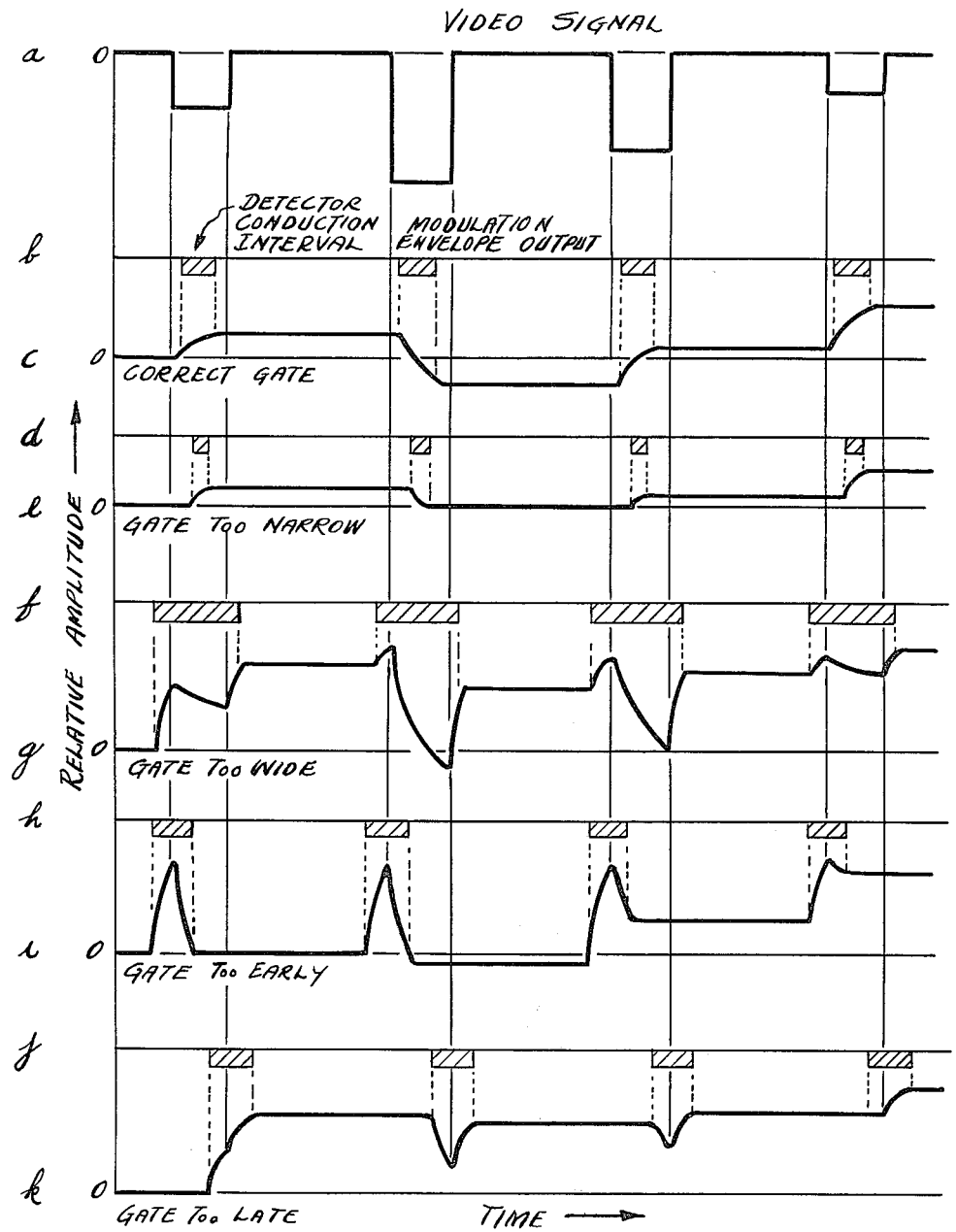

Other objects and many of the attendant advantages of this invention will be readily appreciated as the same becomes better understood by reference to the following detailed description when considered in connection with the accompanying drawings wherein:

FIG. 1 is a block diagram of a countermeasure equipment for use against a tracking radar of the type in which this invention may be utilized, FIG. 2 shows an abbreviated schematic diagram of one type of adder circuit for the equipment of FIG. 1, FIG. 3 is a detailed circuit diagram of an embodiment of this invention for use in the countermeasure equipment shown in FIG. 1, and FIGS. 4 and 5 include waveforms that illustrate characteristics of the circuit shown in FIG. 3.

In FIG. 4, the time scale for the lower curve is compressed by a factor of about 10 relative to the time scale for the upper curve.

The equipment in FIG. 1 is for support on a movable body, e.g., an aircraft, which might become the target of a tracking conical scan radar and includes a substantially omnidirectional antenna 10, a TR device 10A, a radar pulse receiving means including an amplifier 11 tuned to the carrier frequency of incoming tracking pulses and which preserves amplitude variation in the incoming pulses, a detector 12 for detecting the envelope of pulses passing through the amplifier 11 and a linear video amplifier 13 that preserves amplitude variations in the detected pulse envelope. For purposes of this invention, amplifier 11 is assumed to be tuned, it being irrelevant as to how the tuning is accomplished; the carrier frequency of radar pulses from the tracker might have been known previously and the amplifier might have been tuned manually at an earlier time. The receiving means may be selected from prior art devices subject to these two considerations, that the receiving means delay the signal as little as possible namely, a very small fraction of a microsecond, and that it not significantly distort the signal pulses passing through it. The receiving means preferably is designed with an input threshold so as not to respond to tracking signals arriving from sources too far away to be of significance or to random low level noise.

Pulses from linear video amplifier 13 are coupled into two channels, one channel having a low impedance driver 14 and a gated detector 15 in series, and the other channel including a gate pulse generator 16 for providing gating pulses on the order of 0.15 microseconds long to the gated detector 15 to gate open the latter during each gating pulse. A condenser 17 is connected to the output side of the gated detector, the latter being normally operable for blocking any transfer of current in both directions between itself and the condenser 17 but gated open during each trigger pulse from the gate pulse generator 16 and when opened to couple the condenser and the receiving means via a low impedance path so that the voltage on the condenser is adjusted substantially instantaneously, i.e., during each gate pulse according to the change in amplitude of successive pulses arriving at the antenna 10. A cathode follower 18 having a very high impedance input s connected to the condenser 17. Because of the low impedance charge and discharge path for condenser 17 through gated detector 15 when the latter is gated open and because of the very high impedance seen by the condenser between gate pulses, condenser leakage between gating pulses is not significant whereby the voltage on the condenser can change only stepwise during gating pulses and the step changes correspond to the changes in amplitude between successive incoming signal pulses. This is illustrated in the idealized waveforms in the lower part of FIG. 4. To simplify the waveform, the changes in amplitude between successive incoming pulses are shown to be abrupt. Also, for simplicity, the output modulation envelope is shown to be the same amplitude as the modulation of the incoming pulses.

The receiver means must be able to receive without saturation and without distortion a sufficiently wide dynamic range (60db or more) of radar pulse signals to preserve the lobing modulation and the timing information for all incoming signals in this wide range. The normal amplitude range of linear operation of video amplifiers in the prior art with gain unchanged, lies between about 10 and 15db. Therefore, an automatic gain control 19 is connected between the cathode follower 18 and the amplifier 11 to continuously adjust the operating point of the amplifier 11 so that radar pulse signals are not distorted by the linear video amplifier 13.

From cathode follower 18 there is obtained the lobing modulation (shown in the lower part of FIG. 4) on the incoming signals. The lobing modulation is coupled to an inverting amplifier 13A for inverting the phase of the lobing modulation. It is not essential that the inverting gain amplifier be so perfect as to provide an exact mirror image amplitude-wise of the input waveform thereto so long as it inverts the phase of the input waveform. In fact, an exact mirror image may be undesirable. The purpose of the amplifier 13A is to apply low frequency amplitude modulation to the transmitter modulator in a phase opposite to that of the received signal pulses but at a level suitable for such modulation rather than at a level which bears a definite relation to the received pulse level. Too much amplitude modulation on driving pulses for a magnetron for example may cause moding, misfiring, etc., so that it may be necessary to limit the amplitude of the modulation energy in the inverting amplifier 13A. A fraction of the pulse energy from linear video amplifier 13 is coupled to a video amplifier 13B which provides corresponding pulses having a common reference level and substantially all of which extend to a predetermined amplitude threshold obtained by amplifier saturation, clipping or other means. In other words, the purpose of video amplifier 13B is to provide a train of constant amplitude pulses of the same PRF and duty cycle as the signal pulses. An adder circuit 13C adds the phase inverted and perhaps amplitude compressed lobing modulation and the pulses from video amplifier 13B. The resultant amplitude modulated pulse train is fed to the transmitter modulator. Consequently, the transmitter modulator drives the pulse generator (e.g., a magnetron) with amplitude modulated pulses whereby the pulses generated by the countermeasure equipment and radiated toward the tracking radar are amplitude modulated, but with the amplitude modulation of the generated deception pulses being substantially opposite in phase to the amplitude modulation on the intercepted tracking pulses. Incidental frequency shift in the generated wave energy of a magnetron device or the like, as a consequence of amplitude modulation on the driving pulses, is usually not objectionable for this purpose because the acceptance bandwidth of the tracking receiver is wide and probably will be wide enough to accept all the deception pulse energy despite frequency shift in the deception pulses arising from amplitude modulation on the driving pulses. The reason that the acceptance band of the tracking receiver must be wide is that tracking pulses are very narrow and steep and since preservation insofar as possible of the steep leading edges of the tracking pulses is essential for good range data, (because range is measured by counting time between the leading edge of the outgoing pulse and the leading edge of the echo pulse) the tracking pulse receiver acceptance bandwidth must be wide enough to accept enough higher frequency components of the spectrum for reasonably faithful reproduction of the steep narrow pulses. This is a basic requirement of any fire control or tracking radar. Like the countermeasure receiver, the countermeasure transmitter is tuned to the tracking pulse frequency band so that the generated deception pulses will cause the tracking radar to go off target. The mean frequency of the countermeasure transmitter is so related to the tracking pulse frequency that the pulses generated thereby will be accepted by the tracking receiver. The video amplifier 13B, adder circuit 13C and transmitter 20 are designed or selected for as little delay as possible between the leading edge of each pulse from the linear video amplifier 13 and the generation of a deception pulse, so that the deception pulse can arrive at the tracking radar receiver while the range gate is still open at the tracking radar. A tracking radar has a range gate which is manually or automatically set so that the radar can respond only to echoes returned from reflecting objects located within that narrow range of distance from the tracking radar for which the range gate is set; tracking radar also includes a servomechanism for shifting the range gate once a target is selected to keep the tracking radar range gate on target when the target range is changing.

It has been determined from experience that the shape of deception pulses may take forms differing appreciably from the pulses arriving from the tracking equipment and still be effective as a countermeasure against the tracking equipment. However, for purposes of this description, it may be assumed that the shape of the tracking pulses is known previously and that the transmitter is adjusted to generate deception pulses of the same shape.

The advantage of the inverting amplifier 13A in the circuit of FIG. 1 is that it is rapid and requires no signal analysis. The amplitude of the modulation on the deception pulses decreases when the amplitude of the tracking pulse lobing modulation increases. The phase inverted amplitude modulation of the deception pulses sent out by the transmitter when picked up by the tracking receiver deceives that latter so that instead of continuing on target, the tracking radar antenna is moved angularly by its servomechanism, in response to the deceptive modulation, in a direction away from the target and the tracking radar is thus deceived into losing its target.

Because the deception pulses arriving at the tracking receiver have to compete with the target echoes returned to the tracking receiver, the range of operation of the inverting amplifier is restricted; the system operates successfully despite this restriction but it is advantageous to use the inverting amplifier after the range gate at the tracking radar has been sufficiently displaced relative to the target echoes so that there is no competition from the target echoes. One way to accomplish this is first to transmit a train of pulses to the tracking radar which are essentially in coincidence with the target echoes but stronger than the target echoes returned, thereby capturing the range gate at the tracking radar, and then by gradually changing the timing of the transmitted pulses for a predetermined number of pulses, so that the range gate servomechanism at the tracking radar moves the gate in response to these transmitted pulses until the range gate no longer permits any echoes of its own pulses returned from the target from passing through its receiver. Then the inverting amplifier operates to angularly deflect the tracking radar.

The modulator of transmitter 20 geerates a blanking pulse for the gate pulse generator coincident with or even a shade ahead of each outgoing angle deception pulse to ensure that the local transmitter 20 will not trigger the gate pulse generator 16, especially where a received signal pulse has amplitude large enough to cause the local transmitter 20 to generate a deception pulse but too small to trigger the gate pulse generator. A fraction of the driving energy generated by the modulator may be used as bias voltage for blanking purposes. Since blanking pulse circuitry for pulse circuits are well known and since a blanking pulse circuit for this invention may be selected from the prior art literature, it is not described in detail.

A TR device is shown between antenna 10 and amplifier 11 so that one antenna may be used in the system. However, a TR device may introduce objectionable delay under some circumstance in which this invention is utilized. In that case, the system should include two antennas mounted so as to be essentially blind to each other.

FIG. 2 illustrates one type of adder circuit for the system of FIG. 1. The lobing modulation and the constant amplitude pulses are added in the grid resistor and the resultant is obtained at the plate of the tube.

In FIG. 3 there is shown an embodiment of this invention, namely, an automatic gain control and lobing modulation detector for use in the countermeasure system shown in FIG. 1; the disclosed circuit is for several of the stages in FIG. 1, namely, the power amplifier stage of linear video amplifier 13, the low impedance driver 14, the gated detector 15, the gate pulse generator 16, the condenser 17, the cathode follower 18, and the automatic gain control 19. The drawing includes a set of suggested circuit parameters which were used and which operated successfully. Conventional video power amplifier 13 accepts positive pulses up to about 8½ volts in amplitude. Low impedance driver 14 is a cathode follower condenser coupled to the output of amplifier 13 for feeding large negative pulses from the video power amplifier 13 to the gated detector 15, and its output impedance is about 130 ohms; it handles large negative pulses witout cutting off. It serves to charge condenser 17 through gated detector 15 to the peak of an incoming negative video pulse in about 0.15 microseconds.

Gated detector 15 includes a double triode 50a and 50b. The plate of triode 50a and the cathode of triode 50b are connected in common and coupled by condenser 51 to the output of low impedance driver 14. A resistor 52 is connected between condenser 51 and ground; its resistance is a compromise between two considerations, namely, that it be large enough to minimize extra loading on the low impedance driver 14 during charging of capacitor 51 and that it be small enough to permit condenser 51 to discharge between pulses. The only reason condenser 51 changes at all is that it is in series with condenser 17 when the gate is on. A resistor 52 of 100K in the described embodiment will permit condenser 51 to discharge between pulses. It could be made as small as 25K without causing significant difficulty.

Condenser 17 is connected at one end to ground and at its other end to the plate of triode 50b and the cathode of triode 50a in common. Both grids of the double triode are returned to −75 volts so that the triodes 50a, 50b are normally cut off; the triodes are turned on by 150 volt pulses provided by the gate pulse generator 16, described below. The double triode (6080) is selected for double triode 50 because it has low plate resistance, namely, about 300 ohms, whereby when triodes 50a, 50b are gated on, condenser 17 can charge or discharge whichever the case may be, in about 0.15 microseconds, to the peak amplitude of a pulse at the output of low impedance driver 15. Since triode sections 50a and 50b are connected back-to-back, condenser 17 can charge or discharge with equal rapidity during a gating pulse.

There may exist an objectionable amount of heater cathode leakage in double triode 50a, 50b; in order to prevent premature discharge of condenser 17 via this path, in the heater circuit (not shown), the heater is connected across a filament transformer secondary and the centertap of the secondary is connected by a condenser to ground, whereby the heater is isolated from ground. Even with this precaution, some leakage may still occur by way of the cathode of triode section 50a, the heater circuit and thence the cathode of triode section 50b to ground. Though isolating the heaters from ground has proven to be sufficient to prevent significant leakage of charge from condenser 17 through the cathodeheater path of double triode 50a, 50b, still better results can be obtained, at higher expense and increased chassis space by (1) using two separate tubes, each similar to one half the double triode 50a, 50b, and isolating the heater of the tube whose cathode is connected to condenser 17, or (2) to forego the attempt to maintain a charge on condenser 17 in the interval between pulses, using instead a more reasonable value for resistor 54 and inserting a pulse stretcher after the condenser 17 to raise the detector efficiency. The grid-limiting resistor 53 for triodes 50a, 50b prevents the gate pulses from affecting the detector output.

Isolating cathode follower 18 is connected at its input side to condenser 17 and serves to prevent rapid discharge of condenser 17 into the following circuitry and provides at its output side, the amplitude modulation envelope of incoming pulses. The high resistance 54 provides a grid return for cathode follower 18 in the absence of a received signal high enough to operate the detector. As will be apparent, resistor 54 brings the automatic gain control bias to a minimum value after the sudden disappearance of a large signal.

To permit this circuit to act as a true peak detector for only the received tracking pulses, the gate detector 15 must not be opened until the video pulse has risen to its full value (time interval c in FIG. 4), must remain open long enough for condenser 17 to charge to a level corresponding to peak of the incoming pulse (time interval b in FIG. 4) and must be closed again before the video pulse can decay appreciably or an interfering pulse can occur. This is accomplished by gate pulse generator 16. Gate pulse generator 16 is coupled at its input side by condenser 55 to the output side of video power amplifier 13 whereby each negative video output pulse is coupled not only to the channel which includes low impedance driver 14 and gated detector 15 but is also coupled to the gate pulse generator 16 to trigger the latter. The gate pulse generator 16 includes a trigger shaper 56, the leading stage of which is a cathode follower 57, for working with large negative pulses up to about minus 45 volts without cutoff. The only usual feature in the cathode follower 57 is the resistor 58 which serves to suppress parasitic oscillations. At its output side, cathode follower 57 furnishes the negative trigger pulses at a low impedance level.

A pulse stretcher 59 is coupled through condenser 60 to the output side of cathode follower 57 for preventing spurious triggering of the gate pulse generator 16. It includes a resistor 61 connected between the 300 volt supply and condenser 60 which provides a charging current path therefor and a resistor 62 connected between condenser 60 and ground and which provide a discharge current path therefor. When a negative video pulse is coupled into the cathode follower 57, the left side of condenser 60 goes negative and the right side follows. The cathode of triode 63 is connected to the right side of condenser 60 while its plate and grid are joined to one side of condenser 64. The pulse stretching elements are the condenser 64 and resistor 65 connected in parallel between the joined plate and grid of triode section 63 and ground. The condenser 64 is charged negatively in coincidence with a trigger pulse from the video power amplifier and discharges comparatively slowly through resistor 64 thereby stretching the trigger pulse from the video power amplifier 13. The components are so chosen that the stretched pulses decay in about 200 microseconds, or in slightly less time than the shortest contemplated interpulse interval of incoming pulse signal.

A cathode follower 66 is coupled to the pulse stretcher 59 and a one-shot multivibrator 67. The reason for coupling the grids of cathode follower 66 to the pulse stretcher is not to load the pulse stretcher. The one-shot multivibrator 67, which is described in detail below, has a short energy recovery time to be sensitive to a trigger input thereto occurring as little as 0.5 microseconds after that derived from the received radar signal pulse. Since the local transmitter 20 of the countermeasure equipment generates a deception pulse within that order of time, leakage from the local transmitter could trigger the multivibrator 67 permitting the condenser 17 to charge to the amplitude of a leakage pulse from the local transmitter. This effect is precluded by the action of pulse stretcher 59 which prevents a trigger pulse following too closely upon a preceding trigger pulse from triggering the multivibrator 67. The one-shot multivibrator is designed for generating a gate pulse whose width is only a small fraction of the expected width of incoming radar pulses, for gating on and then off the gated detector 15 intermediate the leading end and the trailing end of an incoming pulse so that the charge on condenser 17 continually corresponds to the peak amplitude of successive incoming radar pulses. Because each trigger pulse from the video power amplifier 13 is still present when the gate pulse from one-shot multivibrator is ended, variations in the trigger amplitude applied to multivibrator 67 can affect output pulse duration from the multivibrator and if the trigger amplitude is large enough, it may place the multivibrator momentarily in a free-running state whereby more than one gate pulse may be produced in response to an incoming trigger pulse from video power amplifier 13. The cathode follower 66 serves to limit the maximum trigger amplitude applied to the multivibrator thereby precluding variation in gate pulse duration and the possibility of a freerunnng condition. The components of the cathode follower 66 shown in the drawing provide a voltage at its cathode that is about 5 volts in the absence of signal. Only negative signal pulses can arrive at the grids of the cathode follower. Its cathode can be driven in a negative direction only as far as ground potential and no further. Therefore, the trigger pulse amplitude from cathode follower 66 to the multivibrator cannot exceed about 5 volts, the quiescent output voltage of the cathode follower. The voltage divider including resistors 61 and 62 biases the cathode of triode 63 negative thereby preventing contact potential effect in triode 63 which might otherwise cause a negative voltage to appear on the grids of cathode follower 66 and cause its cathode voltage to drop below the predetermined quiescent voltage of about 5 volts.

The parameters of the one-shot multivibrator components shown on the drawing were selected to produce a very fast output pulse with a short rise time and small starting delay. The section 67A of the multivibrator is normally conducting. When a negative trigger pulse exceeding 3.5 volts amplitude is coupled by the cathode follower 66 to the grid of the section 67A of the multivibrator, a positive pulse is developed at its plate sufficient for turning on the section 67B of the multivibrator which in turn produces a large negative pulse at its plate and consequently across the primary 68 of pulse transformer 69. Simultaneously, a positive pulse appears at the cathode section 67B; the pulse is fed back to the cathode of section 67A via a timing network including condenser 69 and resistor 70 and helps to cut off section 67A. After a short time, condenser 69 acquires a charge allowing the cathode voltage of section 67A to drop and the latter to conduct again terminating the gating pulse. The gain of section 67A to the leading edge of an incoming trigger is increased by condenser 72 and inductance 73, thereby reducing the starting time of the multivibrator.

The output pulse of gate pulse generator 16, about 120–150 volts, and about 0.15 microsecond long, is inverted in pulse transformer 69 and fed by the secondary 74 of the pulse transformer to the grids of triodes 50a and 50b. At the pulse level at which grid current flows in triodes 50a and 50b, the sum of starting delay and rise time is about 0.05 microsecond, measured from the leading edge of the video pulse at the input video power amplifier 13. With this delay, the gate detector is opened when the incoming signal pulse is at peak amplitude so that the charge on condenser 17 will change to peak amplitude of each incoming signal pulse, and not dip toward zero as would happen if the detector were gated open coincident with the beginning of an incoming signal pulse. FIG. 5 includes a series of waveforms that enable comparison of the results obtained with a correct gate relative to the results obtained with gates that either are too narrow, too wide, too early or too late. The pulse transformer 69 is responsible for about half the total delay. The duration of the correct gating pulse is about 0.15 microsecond at the same pulse level, namely, that level at which grid current flows in triodes 50a and 50b. The pulse transformer is selected for an output pulse of 150 volts. Test jack 75 permits observation of the waveform. The functional requirements of pulse transformer 69 is that it be able to transfer fairly high energy narrow pulses with fast rise time. More particularly in the disclosed embodiment it must be able to transfer a 0.2 microsecond pulse with a rise time of 0.05 microseconds or less to fulfill gating requirements. Westinghouse pulse transformers currently marketed under the trade designation of 1P3 or 7P3 or 4P103 are suitable examples.

The remainder of the circuit shown in FIG. 3 is concerned with making the output suitable for use as an automatic gain control bias and for use as a control voltage for the inverting amplifier 13A so that the transmitter will generate pulses suitable for angle deception.

The isolating cathode follower 18 includes triode section 76 whose cathode is at about plus 15 volts direct current for zero voltage on its grid and is below that when there is incoming radar pulses and condenser 17 is charged; its cathode voltage moves in a negative direction with increasing pulse amplitude. Because the required storage time of charge on condenser 17 may be as long as 2,000 microseconds, cathode follower 18 is designed to isolate condenser 17 from the successive circuitry. Since the charge on condenser 17 is substantially constant between successive pulses, the cathode voltage of cathode follower 18 remains constant between pulses. The lobing modulation of incoming tracking pulse signals is obtained at terminal 77 connected to the cathode of triode section 76.

The cathode resistor of cathode follower 18 is returned to minus 300 volts direct current whereby the tap of potentiometer 77 provides a control over the direct current associated with a particular video signal level as explained below.

Automatic gain control 19 includes resistor 78 and condenser 79 connected in series between the tap of potentiometer 80 in the cathode circuit of cathode follower 18 and ground, and a resistor 81 and condenser 82 connected in series between the junction of resistor 78 and condenser 79 and ground. A voltage divider including resistor 83 and potentiometer 84 are connected in series between the minus 300 volt direct current supply and ground to provide a minimum bias for the automatic gain control. Triode 85 connected as a diode is connected between the output terminal 86 of automatic gain control and the tap of potentiometer 84 to prevent the output terminal 86 from going positive relative to the voltage at the potentiometer tap. Diode 85 ensures that the automatic gain control bias does not become zero or positive, even though the tap of potentiometer 80 may be set so that the voltage at the tap is positive when signal is zero. Resistor 78, condenser 79, resistor 81, and condenser 82 function as a low pass filter; the output voltage therefrom does not follow rapid variations in signal amplitude whereby the lobing modulation of the received signal is precluded from causing gain changes in the receiver at a corresponding rate and thereby itself be responsible for changing the incoming signal pulses as seen at the output of the video amplifier.

The potentiometer 80 provides control over the direct current voltage level provided by the automatic gain control for a particular signal level, and with negligible effect on automatic gain control loop gain. The setting of this control determines the operating characteristics of the receiver. If the setting of the tap of potentiometer 80 is for an output voltage that is continuously positive relative to the voltage at the tap of potentiometer 84, diode 85 conducts continuously, the terminal 86 is continuously at substantially the same voltage as the tap of potentiometer 84, namely, minimum bias, and the signal has no effect on the automatic gain control. As the tap of potentiometer 80 goes more negative, there is reached a point where the diode beings to be cut off at least off and on; automatic gain control action begins when diode 85 is cut off. If the setting of the tap of potentiometer is made negative enough for the diode to be continuously cut off, the automatic gain control operates off the amplitude modulation of the incoming pulses to adjust the operating bias of the receiver so that receiver gain is linear.

A manual gain control is included in the circuit and a selector switch 91 permits choice of either the automatic gain control or manual gain control. When switch 91 is open as shown in FIG. 3, the circuit is on automatic gain control and when switch 91 is closed, the circuit is on manual gain control. When the switch is closed, the junction of resistors 78 and 81 is shorted to ground so that terminal 86 is isolated from cathode follower 18. The manual gain control includes resistor 92 and potentiometer 93 connected in series between ground and the minus 300 volt supply and resistor 94 connects the tap of potentiometer 93 to the terminal 86. Condenser 95 bypasses pulse-like variation in the power supply terminal voltage.

The following steps are followed for setting the gain control. With switch 91 closed, the manual gain control 93 is adjusted for maximum gain. Then the minimum bias control 86 is adjusted until the video noise output is not sufficient to trigger the gate pulse generator 16 or transmitter 20 and the receiver amplifier does not draw grid current. Then the switch 91 is opened and using an input signal just large enough to operate gate pulse generator 16, and the agc-delay control is adjusted until the bias just breaks away from the minimum value when the signal is increased. This adjustment gives zero agc delay (that is the voltage threshold at which the agc takes effect is zero). If it is desired to increase the video output amplitude under agc operation, the delay control 80 is adjusted to a more positive direct current voltage whereby the agc threshold occurs at a larger value of video signal. Adjustment of delay control 80 in the opposite direction is undesirable, as it leads to a condition where the minimum bias is controlled by the setting of the delay control 80, diode 85 having no effect, and is more negative than is called for by the minimum bias control 84. This would result in making the maximum amplifier gain lower than the optimum permitted by noise considerations.

When tracking pulses are received at a moving station as described above, it is conceivable that another moving station in the vicinity might be the target being tracked. However, two facts make the latter situation very unlikely, particularly if tracking pulses continue to be received. One fact is that the tracker range gate is very narrow tending to exclude any more than a single target. The other fact is that the beam is very narrow likewise tending to exclude any more than a single target. It is highly unlikely that two moving stations (e.g., aircraft) can maintain the same bearing and elevation with respect to the tracking radars for any length of time. Any such coincidence would be transitory. If the moving station, which is not the target does turn on its countermeasure equipment, his position is not revealed because the tracker range gate excludes his deception pulses. He merely errs on the side of safety.

Obviously many modifications and variations of the present invention are possible in the light of the above teachings. It is therefore to be understood that within the scope of the appended claims the invention may be practiced otherwise than as specifically described.

I claim:

1. A device for detecting at a target the lobing modulation of tracking pulses arriving at said target from a conical scan radar and with a time lag between the detected modulation relative to the actual modulation of said pulses on the order of a fraction of the width of the tracking pulses which comprises, at said target, receiving means for intercepting, amplifying and detecting said tracking pulses, modulation voltage level storing means, gate detector means for providing a low impedance conducting path between said receiving means and said modulation voltage level storing means, normally operable for blocking any transfer of current in both directions between said receiving means and said modulation voltage level storing means but operable when unblocked to connect said receiving means and said modulation voltage level storing means and said receiving means and thereby to adjust the voltage on said modulation voltage level storing means according to the amplitude of the detected pulse arriving while the gate detector means is unblocked, gate pulse generating means connected between said receiving means and said gate means, responsive to each detected pulse for providing a gate pulse to said gate detector means to unblock said gate means, solely during a peak portion of the detected pulse, lobing modulation providing means having a high input impedance and a low output impedance connected to said modulation voltage level storing means and operable to resist attenuation therethrough of voltage on said modulation voltage level storing means and providing a voltage output varying according to the voltage variations on said modulation voltage level storing means, and means connecting said lobing modulation providing means and said receiving means for providing automatic gain control bias to said receiving means to cause the latter to operate continuously linearly independently of incoming pulse amplitude thereby preserving the lobing modulation on the incoming pulses.

2. The device according to claim 1 wherein said gate pulse generating means is activated solely by the initial change in each detected pulse for causing an opening of said gate means during the peak period of such detected pulse and for then causing closing of said gate means during the peak period of such detected pulse.

3. A device as defined in claim 1 wherein said gate pulse generating means includes pulse stretching means for pulses from said receiving means whereby a pulse from said receiving means cannot trigger said gate pulse generator if it follows in less than a predetermined interval after the immediately preceding pulse from the receiving means.

4. A device as defined in claim 3 wherein said gate generating means includes a fast acting one-shot multivibrator, and limiting means connected to the triggering side of said multivibrator to prevent variations in amplitude in incoming pulses from having an effect on the output of the multivibrator.

5. A device for detecting, at a target, the lobing modulation of tracking pulses arriving at said target from a conical scan radar with time lag on the order of a fraction of the width of the tracking pulses which comprises, at said target, receiving means for intercepting, amplifying and detecting said tracking pulses, a condenser, low impedance gate means connecting said receiving means and said condenser, normally operable for blocking any transfer of energy in both directions between said receiving means and said condenser but operable when opened to connect said condenser and receiving means and thereby adjust the voltage on said condenser according to the amplitude of the detected pulse arriving while the gate is opened, gate pulse generating means connected between said receiving means and said gate means, responsive to said detected pulse and causing opening of said gate means solely during a selected portion of the peak of said pulse, bias creating means having a high input impedance and low output impedance connected to said condenser for providing a bias voltage varying according to the voltage variations on said condenser and means connecting said bias creating means and said receiving means for providing automatic gain control bias to said receiving means and cause the latter to operate continuously linearly independently of incoming pulse amplitude and preserve lobing modulation of the incoming pulses.

6. A device as defined in claim 5 wherein said gate means includes two substantially identical tubes having a control grid each and said tubes being connected with the grids in common and with the plates and cathodes of the two tubes connected inversely to each other, means biasing said two tubes by the same amount beyond cutoff and for coupling gating pulses generated by said gate pulse generating means to the commonly connected grids whereby current can flow with equal rapidity in either direction through said gate means relative to said condenser during each gating pulse and whereby the impedance of said gate means to current flow during a gating pulse is equal for both directions.

7. A device for detecting at a target the lobing modulation of tracking pulses arriving at said target from a conical scan radar and with a time lag between the detected modulation relative to the actual modulation of said pulses on the order of a fraction of the width of the tracking pulses which comprises, at said target, receiving means for intercepting, amplifying and detecting said tracking pulses, modulation voltage level storing means, gate detector means for providing a low impedance conducting path between said receiving means and said modulation voltage level storing means, normally operable for blocking any transfer of current in both directions between said receiving means and said modulation voltage level storing means but operable when unblocked to connect said receiving means and said modulation voltage level storing means and said receiving means and thereby to adjust the voltage on said modulation voltage level storing means according to the amplitude of the detected pulse arriving while the gate detector means is unblocked, gate pulse generating means connected between said receiving means and said gate means, responsive to each detected pulse for providing a gate pulse to said gate detector means to unblock said gate means, solely during a peak portion of the detected pulse, and lobing modulation providing means having a high input impedance and a low output impedance connected to said modulation voltage level storing means and operable to resist attenuation therethrough of voltage on said modulation voltage level storing means and providing a voltage output varying according to the voltage variations on said modulation voltage level storing means.

* * * * *